United States Patent [19]

Ofstead et al.

[11] 4,239,874

[45] Dec. 16, 1980

[54] CYCLOPENTENE COPOLYMERIZATION PROCESS

[75] Inventors: Eilert A. Ofstead, Cuyahoga Falls; Michael L. Senyek, Tallmadge, both of Ohio

[73] Assignee: The Goodyear Tire & Rubber Company, Akron, Ohio

[21] Appl. No.: 12,990

[22] Filed: Feb. 21, 1979

Related U.S. Application Data

[63] Continuation-in-part of Ser. No. 831,202, Sep. 7, 1977, abandoned.

[51] Int. Cl.³ .................... C08F 4/62; C08F 232/00
[52] U.S. Cl. ............................. 526/143; 252/429 B; 526/142; 526/283
[58] Field of Search ...................... 526/142, 143, 283

[56] References Cited

U.S. PATENT DOCUMENTS

| | | | |
|---|---|---|---|
| 3,631,010 | 12/1971 | Witte et al. | 526/143 |
| 3,778,420 | 12/1973 | Brown et al. | 526/283 |
| 3,941,757 | 3/1976 | Wakabayashi et al. | 526/283 |
| 4,025,708 | 5/1977 | Minchak et al. | 526/142 |
| 4,137,390 | 1/1979 | Ofstead | 526/142 |

*Primary Examiner*—Edward J. Smith
*Attorney, Agent, or Firm*—J. Y. Clowney

[57] ABSTRACT

There is disclosed a process for the preparation of gel-free rubbery copolymers of cyclopentene and dicyclopentadiene by means of a catalyst system comprising (A) a soluble tungsten halide or oxyhalide, (B) an organoaluminum compound, (C) an alcohol and (D) a polyhalogenated phenol.

3 Claims, No Drawings

CYCLOPENTENE COPOLYMERIZATION PROCESS

This is a continuation in part of application Ser. No. 831,202 filed Sept. 7, 1977, now abandoned.

This invention is directed to a process for the ring-opening copolymerization of polycyclic unsaturated hydrocarbons with cyclopentene. This invention further relates to the preparation of rubbery, essentially gel-free copolymers of polycyclic unsaturated hydrocarbons and cyclopentene. More specifically, this invention relates to the preparation of rubbery, essentially gel-free, copolymers of dicyclopentadiene and cyclopentane. These rubbery copolymers have a desirable combination of properties which make them well suited for use in a variety of manufactured rubber articles, including tires.

BACKGROUND OF THE INVENTION

The catalyst systems useful in the practice of this invention are known broadly as olefin metathesis catalysts. The olefin metathesis reaction is a general reaction of olefins, both cyclic and acyclic, and is known to proceed by the catalyzed cleavage of carbon-to-carbon double bonds, and the subsequent recombination of the resulting fragments to form new olefinic species:

$$2\ CH_3CH{=}CHC_2H_5 \longrightarrow$$

$$CH_3CH{=}CHCH_3 + C_2H_5CH{=}CHC_2H_5$$

When cycloolefins react in the presence of an olefin metathesis catalyst, ring cleavage occurs, and high molecular weight polymers result. Thus, cyclopentene yields the linear polymer polypentenamer:

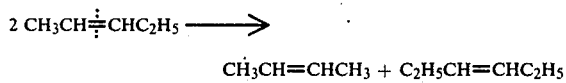

The structure of this cyclopentene polymer may also be represented by the equivalent formula:

As a further example, when dicyclopentadiene reacts, only one of the double bonds normally undergoes the metathesis reaction and so polymerization occurs to give a predominantly linear polymer:

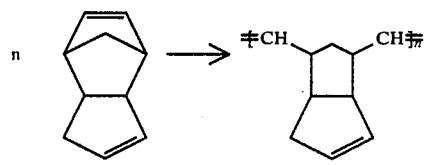

The structure of the dicyclopentadiene polymer may also be represented by the equivalent formula:

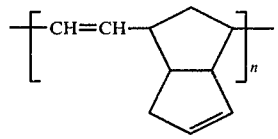

A wide variety of catalysts suitable for the metathesis of acyclic olefins and for the homopolymerization of cycloolefins are known in the art, but considerable difficulties have been encountered in attempts to prepare rubbery, soluble copolymers from dicyclopentadiene and cyclopentene which contain a substantial proportion of dicyclopentadiene, i.e., greater than about 10% by weight of dicyclopentadiene. Thus, in U.S. Pat. No. 3,598,796 there is disclosed a process for making rubbery homopolymers of cyclopentene. However, when a mixture of cyclopentene and dicyclopentadiene containing 20% by volume of dicyclopentadiene was polymerized in a solvent, the product was found to be nonelastomeric and only partially soluble.

It has been found that dicyclopentadiene generally has a great tendency to homopolymerize in the presence of other cycloolefins, and that the resulting blocky segments of non-rubbery homopolymers greatly interfere with the desired elastomeric properties of the intended copolymers, causing them to become stiff and inelastic and unsuitable for use in articles where rubbery qualities are required. These copolymers are further generally characterized as being opaque or translucent rather than transparent, and are only poorly soluble in customary rubber solvents such as benzene, toluene, hexane, cyclohexane and the like.

The terms "rubbery" and "non-rubbery", as used herein, describe in a qualitative way, the combination of properties of a solid material which result from its inherent hardness, elasticity, and resilience, and are not expressed easily in quantitative terms. However, one can measure and compare the stiffness, or hardness, of a material as one measure of rubberiness, since conventional rubbers are characterized as being relatively soft at temperatures of about 25° C.

Stiffness can be expressed as the Young's modulus of a material. Typical values for the Young's modulus of familiar elastomers may be found in "Polymers Handbook, Section Edition", J. Brandrup and E. H. Immergut, Ed., John Wiley and Sons, N.Y., 1975, pages V-7 et seq. Thus, common elastomers such as polyisoprene, butyl rubber, SBR (styrene-butadiene rubber) and polychloroprene are stated to have values of Young's modulus ranging from about 1.0 to about 1.6 mega pascal (MPa) in the absence of fillers such as carbon black or plasticizers such as processing oils. Plastics such as polyethylene, polypropylene and polystyrene, on the other hand, all have much higher Young's modulus values and are characteristically quite stiff and non-rubbery.

In order to overcome problems associated with the copolymerization of dicyclopentadiene and cyclopentene, certain procedures have been proposed. Thus, in U.S. Pat. No. 3,707,520 there is described a two-stage process whereby, in the first stage, cyclopentene is polymerized to at least 40% conversion, followed by the gradual introduction of dicyclopentadiene during the second stage of the polymerization. However, if the polymerization of cyclopentene is not carried to at least 40% conversion in the first stage, the final product is found to be unsatisfactory.

Similarly, U.S. Pat. No. 3,941,757 describes a two-stage process wherein the homopolymerization of cyclopentene is first initiated, and thereafter a solution containing a polycyclic olefin such as dicyclopentadiene and also containing a tungsten or molybdenum compound is very gradually introduced into the polymerizing cyclopentene solution. It is essential that the transition metal compound be present in the solution of the polycyclic olefin when it is added to the polymerizing mass. If the transition metal compound is not present in this solution prior to its introduction into the polymerization mixture, then only a low yield of polymer having excessive stiffness resulted.

In order to avoid the necessity of using a two-stage polymerization process and at the same time overcome the tendency to form a substantial amount of insoluble polymer, an alternative method has been proposed for the preparation of cyclopentene/dicyclopentadiene copolymers which contain very little insoluble polymer. Thus, U.S. Pat. No. 4,002,815 describes a polymerization process wherein organoaluminum iodides, or optionally, a combination of a trialkylaluminum compound and elemental iodine, are employed as essential cocatalysts in conjunction with soluble tungsten compounds. Organoaluminum chlorides are unsatisfactory. Additionally, this process requires the presence of from 1 to 30 mole percent of an acyclic olefin, relative to the total amount of monomers, in order to avoid the formation of insoluble products. However, if less than 1 mole percent of acyclic olefin were used, yields were poor or the products contained substantial amounts of insoluble polymer.

Also, see U.S. Pat. No. 3,933,778.

Further, each of the above processes have been demonstrated to be effective when aromatic solvents such as benzene, toluene or chlorobenzene are used. However, yields and rates of polymerization are much inferior when aliphatic or cycloaliphatic solvents are employed and consequently undesirably high catalyst concentrations and long reaction times become necessitated. Thus, these processes are unattractive for industrial applications where aliphatic or cycloaliphatic solvents need be employed.

It is, therefore, an object of the present invention to provide an efficient method for the preparation of rubbery, essentially gel-free copolymers of cyclopentene and dicyclopentadiene, wherein aliphatic or cycloaliphatic solvents may be effectively employed as well as aromatic solvents.

SUMMARY OF THE INVENTION

Substantially gel-free, rubbery copolymers of cyclopentene and dicyclopentadiene containing from 10 to 60 percent by weight of dicyclopentadiene are prepared in aliphatic, cycloaliphatic or aromatic solvents by copolymerizing cyclopentene with dicyclopentadiene in a single-stage continuous polymerization reactor in the presence of a catalyst system comprised of (A) a soluble tungsten halide or oxyhalide, (B) at least one compound selected from the group consisting of trialkylaluminum compounds, dialkylaluminum chlorides, alkylaluminum dichlorides and alkylaluminum sesquichlorides, (C) at least one hydroxy compound selected from the group consisting of aliphatic alcohols and alcohols substituted with alkoxy- or aryloxy- groups and (D) a polyhalogenated phenol of the general formula:

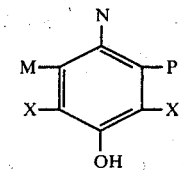

where X is chlorine or bromine and M, N and P are selected from the group consisting of H, Cl and Br.

This process provides excellent rates of polymerization even at low catalyst concentrations. In addition, gel-free polymers are obtained even when the amount of acyclic olefin present is less than 0.1% by weight relative to the total monomers present. This process further permits the use of aliphatic and cycloaliphatic solvents such as hexane and cyclopentane which are more easily removed during the drying of the polymer than are the higher boiling aromatic solvents such as benzene, toluene and the like.

Rubbery copolymers of the present invention, free of plasticizers and fillers, have a stiffness, as indicated by Young's modulus, which generally falls within the range of about 1.0 to 2.0 MPa, which is comparable to the range of values found for other conventional elastomers. Thus, these materials are suitable for typical applications where rubbery properties are required, particularly as in automobile tires.

DETAILED DESCRIPTION

The process of this invention comprises the ring-opening copolymerization of cyclopentene with at least one polycyclic unsaturated or polycyclic polyunsaturated, nonconjugated alicyclic compound. The preferred polycyclic monomers are dicyclopentadiene and the trimer of cyclopentadiene:

Representative of the tungsten compounds (A) are the chlorides and bromides such as tungsten hexachloride, tungsten hexabromide, tungsten pentabromide, tungsten oxytetrachloride, tungsten oxytetrabromide and the like. However, it is preferred to use tungsten hexachloride.

Representative of the organoaluminum compounds (B) are trimethylaluminum, triethylaluminum, tripropylaluminum, triisobutylaluminum, dimethylaluminum chloride, diethylaluminum chloride, diisobutylaluminum chloride, methylaluminum sesquichloride, ethylaluminum sesquichloride, isobutylaluminum sesquichloride, ethylaluminum dichloride, propylaluminum dichloride, butylaluminum dichloride, and the like.

Representative but not restrictive of the aliphatic alcohols and substituted aliphatic alcohols (C) of the present invention are methanol, ethanol, propanol, isopropanol, butanol, isobutanol, hexanol, cyclohexanol, 2-methoxyethanol, 2-ethoxyethanol, 2-phenoxyethanol, 2-phenylethanol, and the like.

Representative of the polyhalophenols (D) are 2,6-dichlorophenol, 2,3,6-trichlorophenol, 2,4,6-trichlorophenol, 2,3,4,6-tetrachlorophenol, pentachlorophenol, 2,6-dibromophenol, pentabromophenol, 2-chloro-6-bromophenol, and the like.

It is preferred to employ the aliphatic alcohol (C) in an amount equal to about 0.5 to about 2.0 moles per mole of the tungsten compound (A), and to employ the polyhalophenol (D) in an amount equal to about 1.0 to about 3.0 moles per mole of the tungsten component (A). The preferred amount of the organoaluminum compound (B) will depend upon the reaction condition, but it is generally preferred to employ the (B) compound in an amount equal to about 0.5 to about 5.0 moles per mole of the tungsten compound (A).

A catalytically effective amount of the tungsten component (A) must be employed. This amount will vary with the reaction conditions, purity of the monomers, etc., but generally, an amount equal to about 0.02 to about 0.50 parts by weight of the (A) component per 100 parts of combined monomers is satisfactory.

The catalyst components of the present invention may be employed in a variety of procedures known in the art. Thus, in the continuous polymerization process of the present invention, each of the catalyst components or solutions thereof may be introduced in a continuous fashion separately into the polymerization reactor. Alternatively, the (A) component may be combined with either the (C) or the (D) component, or with both the (C) and the (D) components prior to introducing the (A) component into the reactor. However, it is preferred not to contact the organoaluminum (B) component with any of the other catalyst components prior to introducing this (B) component into the reactor. In the handling and transfer of the various catalyst components, it is often convenient to utilize solutions of these components in suitable inert solvents, such as benzene, toluene, chlorobenzene, hexane, cyclohexane, cyclopentane and the like.

It has been found that when catalyst component (A) is pre-reacted with either component (C) or (D), it is advantageous to remove some of the hydrogen chloride which is formed as a byproduct of this step. Known techniques may be used to remove this hydrogen chloride; these include the use of a stream of an inert gas, such as nitrogen, which can be bubbled through the catalyst solution, or the use of a vacuum to withdraw hydrogen chloride vapors.

In order to prepare soluble, rubbery copolymers of cyclopentene and dicyclopentadiene containing from 10 to 60 percent by weight of dicyclopentadiene, it has been found to be essential to employ a continuous polymerization procedure rather than a batch process. According to this procedure, solutions of the various monomers and catalyst components are continuously introduced in a controlled fashion into a reactor containing an efficient agitator, while concurrently a continuous discharge of the polymerizing mass is maintained. A means of maintaining constant temperature in the reactor is desired, such as a cooling coil or an external jacket; and air and moisture must be excluded.

The solvent or mixture of solvents chosen for the process of this invention may vary. However, the solvent should not adversely affect the action of the catalyst or the solubility of the products. Representative examples of useful solvents are benzene, toluene, xylene, chlorobenzene, cyclopentane, methylcyclopentane, cyclohexane, methylcyclohexane, cycloheptane, pentane, hexane, heptane, octane, and the like.

The concentrations of the monomers in the mixture of monomers and solvent which is continuously fed to the reactor may vary. It is preferred to use a cyclopentene concentration of from about 10 to about 50 percent by weight of the total weight of solvent and combined monomers. The concentration of the dicyclopentadiene may also vary, and it is preferred to use an amount which is less than the amount of cyclopentene. Satisfactory results are obtained when the amount of the dicyclopentadiene varies over the range of about 1 percent to about 20 percent of the combined weight of monomers and solvent.

The manner in which the continuous polymerization is initiated is of some interest. It is preferred to avoid a relatively high concentration of dicyclopentadiene in the reactor when the copolymerization is first initiated, in order to minimize the tendency to form insoluble products at this stage. A variety of procedures may be employed, but typically a solution containing from about 15 to about 30% by weight of cyclopentene in the desired solvent, and containing less than 3% by weight of dicyclopentadiene, is preferred for the initiation of the polymerization. The polymerization of this initial charge in the reactor is begun by the introduction of a sufficient amount of catalyst to promote substantial polymerization of the initial charge. The amount is not critical, but an amount sufficient to produce an initial rate of polymerization of cyclopentene of at least about 10% within the first 30 minutes of the reaction is preferred. During this period or shortly thereafter, the simultaneous introduction of the various monomer and catalyst solutions should be initiated to commence the continuous phase of the polymerization process. The rate of feed of ingredients should be such as to maintain an average residence time of from about 15 minutes to about 6 hours. Polymers of the intended composition generally will not be achieved until after about 3 to 6 residence times for the continuous phase of the reaction have passed since the monomer composition in the combined feed to the reactor is generally substantially different from that used in the initiating charge in the reactor.

It may be desirable to introduce an acyclic olefin or mixture of olefins into the reactor during the initiation phase of the polymerization, and also during the continuous phase of the polymerization as an aid in controlling polymer molecular weight. The use of olefins for molecular weight control in cycloolefin metathesis polymerizations is known in the art, as demonstrated in U.S. Pat. No. 3,754,046. The olefin or olefins may be present adventitiously in the monomers, or may be added intentionally. Suitable olefins include ethylene, linear $\alpha$-olefins, such as 1-pentene, and linear internal olefins such as 2-pentene. If branching of the carbon chain is present in the olefins, it should not occur at the olefinic carbons. The olefin or mixture of olefins may be introduced into the reactor with the monomers as part of the solution of monomers and solvent, or it may also be introduced separately so as to provide additional freedom in adjusting the polymer molecular weight during the polymerization process. The amount of olefins normally desired in the present process ranges from about 0.01 to about 0.5 percent by weight of the total amount of cycloolefin monomers and is preferably in the range of about 0.02 to 0.2% by weight.

Moderate amounts of the conjugated dienes such as isoprene, butadiene, piperylene and cyclopentadiene, often present as impurities in the reaction mixture, can be tolerated by the present polymerization catalyst system, although conjugated dienes are known to be active polymerization inhibitors with other catalyst systems such as those described in U.S. Pat. No. 4,002,815. For example, a diene content of from 0 to about 3% by weight in the dicyclopentadiene can readily be tolerated with the catalyst system of the present invention. This is advantageous since typical commercial grades of dicyclopentadiene frequently contain small amounts of dienes as impurities. With the present catalyst system, these impurities need not be removed.

The polymerization process of the present invention may be carried out over a range of temperatures from −25° C. to +100° C., but the preferred temperatures range from about 0° C. to 75° C.

The polymer solution which is discharged continuously from the reactor may be processed in a variety of ways in order to recover the product. It is usually preferred to combine a catalyst deactivating agent, such as an alcohol, water, or other reactive material, with the polymer solution shortly after it is discharged from the reactor. A stabilizing agent of the type known as an antioxidant may also be added to the polymer solution at this time. The resulting mixture may be processed to remove volatile solvents and unreacted monomers in a variety of familiar ways, including air drying, vacuum oven drying and treatment with a combination of steam and hot water, followed by further drying to eliminate water.

The practice of this invention is further illustrated by the following examples, which are intended to be representative rather than restrictive of the scope of this invention. All polymerizations and handling of catalyst solution were conducted in an atmosphere of dry nitrogen.

EXAMPLES

Polymerization Apparatus

The one-gallon glass-lined polymerization reactor which was used in the following examples was fitted with an internal cooling coil and an efficient agitator. The head of the reactor was fitted with inlet tubes for the individual introduction of (1) the mixture of monomers and solvent, (2) the tungsten catalyst solution, and (3) the organoaluminum catalyst solution. These inlet tubes introduced the reagents below the surface of the polymerizing solution. A discharge tube fitted with an adjustable valve was used to control the rate of discharge of polymer solution from the reactor. The head of the reactor was also fitted with connections for providing an atmosphere of dry nitrogen, and for relief of pressure as needed. A thermometer in a thermowell was employed for temperature measurement.

Three holding tanks were employed for storing (1) the mixture of monomers and solvent, (2) the tungsten catalyst solution, and (3) the organoaluminum catalyst solution. These tanks were connected to individual, adjustable metering pumps for the precise control of flow of these solutions to the polymerization reactor. An atmosphere of dry nitrogen was maintained in each holding tank.

General Polymerization Procedure

The desired mixture of dicyclopentadiene, cyclopentene and solvent, designated as the "feed premix", was purified by being passed through a drying bed consisting of a mixture of anhydrous alumina and anhydrous silica gel. This solution was then charged directly into the clean, dry, nitrogen-filled holding tank from which it was to be metered into the reactor.

The tungsten catalyst solution was prepared by dissolving sufficient tungsten hexachloride in toluene and dry cyclohexane to give a 0.018 molar tungsten hexachloride solution. To this was added ethanol (molar ratio of ethanol/$WCl_6$=1) and pentachlorophenol (molar ratio of pentachlorophenol/$WCl_6$=2). After the ethanol and pentachlorophenol had reacted, a stream of nitrogen was bubbled through the solution briefly to expel some of the hydrogen chloride which had formed. This solution was then diluted with 3 volumes of a dried aliphatic solvent (either hexane or cyclohexane) per volume of toluene, giving a 0.0045 molar solution of the tungsten component. This diluted solution was then transferred to the designated holding tank from which it was to be metered into the reactor.

A 0.014 molar solution of the desired organoaluminum compound in dry hexane was prepared and transferred into its designated holding tank.

A solution of cyclopentene in the desired solvent, designated as the "reactor premix" was prepared and passed through a drying bed consisting of a mixture of anhydrous alumina and anhydrous silica gel. This solution was then charged directly into the clean, nitrogen-filled reactor, brought to the desired reaction temperature, and a sufficient amount of catalyst was introduced into the reactor to initiate rapid polymerization of the cyclopentene. The amount of catalyst required was generally equivalent to a molar ratio of tungsten compound/cyclopentene of about 1/4000.

The continuous phase of the polymerization reaction was commenced (i.e., the continuous feeding of catalysts and monomers was initiated) within 30 minutes following the first charging of catalysts to the "reactor premix" to initiate polymerization. A relatively high rate of feed of catalyst components of about twice the ultimate desired rate was maintained during the first 1-2 hours of the continuous reaction. Thereafter the catalyst feed rate was reduced to the desired rate and a steady state condition of the continuous reaction phase was achieved after a total of about six hours of reactor operation.

The emerging polymer solutions were terminated continuously with a mixture of alcohol and sufficient 2,6-ditertiary-butyl-para-cresol (an antioxidant) to provide about 1 part of antioxidant per 100 parts of polymer. After drying, all polymers were shown to be virtually completely soluble in toluene and were obviously elastomeric.

EXAMPLES 1-5

Experimental conditions and results are given in Table I. The glass transition temperatures (Tg) reported in Table I were determined by differential scanning calorimetry. Inherent viscosities of the polymers were measured in toluene at 30° C. The dicyclopentadiene contents reported in Table I were determined by inspection of high resolution $^1H$ or $^{13}C$ nuclear magnetic resonance spectra.

In the example of number 4, the resulting polymer was found to have a Young's modulus, as measured using an Instron penetration test, of 1.0 MPa. The Shore A hardness was 42. The polymer banded well on a conventional rubber mill.

TABLE I

CONTINUOUS POLYMERIZATION OF CYCLOPENTENE AND DICYCLOPENTADIENE

| | \multicolumn{5}{c}{EXAMPLES} | | | | |
|---|---|---|---|---|---|
| | 1 | 2 | 3 | 4 | 5 |
| WCl$_6$ diluent | hexane | hexane | cyclopentane | cyclohexane | cyclohexane |
| "Reactor Premix": | | | | | |
| Solvent | hexane | hexane | cyclopentane | cyclohexane | cyclohexane |
| cyclopentene (CP), wt. % | 21.8 | 22.0 | 18.6 | 20.0 | 19.4 |
| pentenes + hexenes* | 0.09 | 0.09 | 0.04 | 0.04 | 0.05 |
| "Feed Premix": | | | | | |
| Solvent | hexane | hexane | cyclopentane | cyclohexane | cyclohexane |
| cyclopentene, wt. % | 31.0 | 24.1 | 19.3 | 22.4 | 17.4 |
| pentenes + hexenes* | 0.09 | 0.07 | 0.03 | 0.02 | 0 |
| dicyclopentadiene** (DCPD), wt. % | 4.31 | 6.68 | 6.25 | 5.41 | 9.03 |
| Conditions after 6 hrs. of continuous operation: | | | | | |
| [CP + DCPD]/WCl$_6$, molar ratio | 5000 | 3450 | 3570 | 7700 | 3220 |
| Organoaluminum cocatalyst | Et$_{1.5}$AlCl$_{1.5}$ | Et$_{1.5}$AlCl$_{1.5}$ | Et$_{1.5}$AlCl$_{1.5}$ | Et$_2$AlCl | Et$_2$AlCl |
| Al/W, atomic ratio | 1.84 | 2.10 | 2.30 | 2.06 | 2.10 |
| Temperature, °C. | 10 | 18 | 14 | 15 | 22 |
| Residence time, min. | 60 | 69 | 65 | 47 | 50 |
| Conversion, % | 66 | 58 | 61 | 59 | 53 |
| Polymer properties: | | | | | |
| inherent viscosity | 1.53 | 1.60 | 1.70 | 1.65 | 1.30 |
| % gel | 0.2 | 0 | 0 | 0 | 1.4 |
| Tg, °C. | −83 | −55 | −45 | −63 | −24 |
| Mooney viscosity, ML-4(212° F.) | 60 | 148 | 142 | — | — |
| DCPD content, wt. % | 18 | 38 | 42 | 33 | 54 |

*As weight percent of cyclopentene
**Dicyclopentadiene contained 1.2% by weight of conjugated C$_5$ dienes.

EXAMPLE 6 (Comparative Example)

In this example a batch polymerization was carried out in order to compare results with those obtained in the continuous polymerization described under Example 4 above, with all other conditions maintained essentially constant.

A solution of cyclopentene, dicyclopentadiene and olefins, having essentially the same composition as that used in Example 4, was dried with silica gel and charged under dry nitrogen to a 1-quart bottle. To 541 grams (g) of this solution at 24° C. was added (a) 3.0 ml of a 0.05 molar solution of tungsten hexachloride in toluene which had been modified with ethanol and pentachlorophenol (w/ethanol/pentachlorophenol=1/1/2) and (b) 1.5 ml of a 0.20 molar solution of diethylaluminum chloride in hexane. The reaction mixture immediately began to turn milky and opaque, then became gelled such that the mixture would not flow.

After one hour at 24° C., the reaction was terminated with isopropanol and a trace of 2,6-ditertiary-butyl-4-methylphenol was added. The product was isolated by vacuum oven drying to give a 40% yield of leathery, resinous copolymer.

The product exhibited the following properties: gel 64%; inherent viscosity in toluene 0.96; glass transition temperature—none was distinct although a weak transition at −98° indicated the possibility of some cyclopentene homopolymer; Shore A hardness 85; Young's modulus 18.5 MPa. In addition the polymer could not be molded properly in a hot press and crumbled when placed on a rubber mill. The Young's modulus and Shore A hardness values are high and characteristic of plastic properties rather than elastomeric behavior. The material was entirely unsuitable for use as the rubber component in rubber goods.

While certain representative embodiments and details have been shown for the purpose of illustrating the invention, it will be apparent to those skilled in this art that various changes and modifications may be made therein without departing from the spirit or scope of the invention.

What is claimed is:

1. A process for the preparation of substantially gel-free, rubbery copolymers of cyclopentene and dicyclopentadiene comprising polymerizing mixtures of cyclopentene and dicyclopentadiene containing from 10 to 60 percent by weight of dicyclopentadiene in an aliphatic, cycloaliphatic or aromatic solvent, and wherein the polymerization is conducted in a single stage continuous polymerization reactor in the presence of a catalyst system comprising (A) a soluble tungsten halide or oxyhalide, (B) at least one compound selected from the group consisting of trialkylaluminum compounds, dialkylaluminum halides, alkylaluminum sesquihalides and alkylaluminum dichlorides, (C) at least one hydroxy compound selected from the group consisting of aliphatic alcohols and aliphatic alcohols substituted with alkoxy or aryloxy groups, and (D) a polyhalogenated phenol of the general formula:

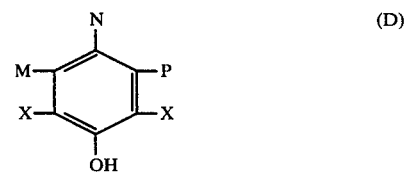

(D)

where X is chlorine or bromine and M, N and P are selected from the group consisting of H, Cl and Br, and wherein the molar ratio of A:B:C:D lies within the range of 1:0.5–5:0.5–2:1–3.

2. A process according to claim 1 wherein the temperature lies within the range of 0°–75° C. and wherein the (A) catalyst component is WCl$_6$, and wherein the solvent is selected from the group consisting of pentane, hexane, heptane, cyclopentane and cyclohexane.

3. A process according to claim 2 wherein the (C) catalyst component is selected from the group consisting of methanol, ethanol, propanol, 2-methoxyethanol, 2-ethoxyethanol and 2-phenoxyethanol, and wherein the (D) catalyst component is selected from the group consisting of pentachlorophenol, 2,4,6-trichlorophenol and 2,6-dichlorophenol.

* * * * *